Dec. 7, 1965    C. C. LAGOS ETAL    3,222,214
METHOD OF PREPARING ELECTROLUMINESCENT DEVICES
Filed Sept. 5, 1961
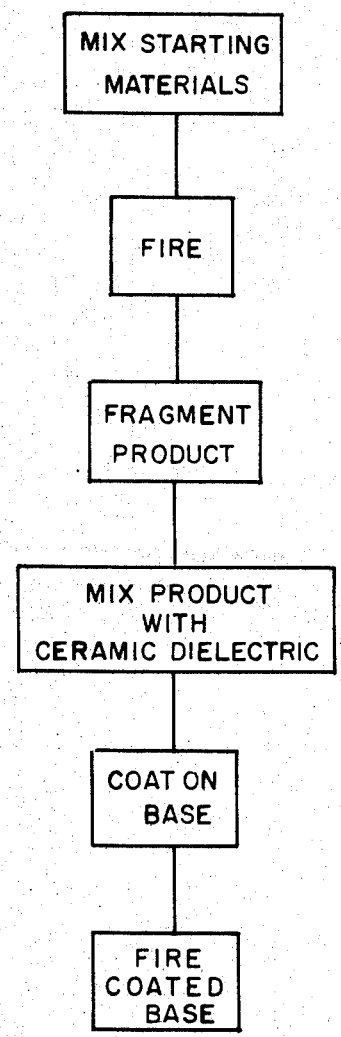
COSTAS C. LAGOS
LESTER W. STROCK
  *INVENTORS*
BY *[signature]*
ATTORNEY

United States Patent Office 3,222,214
Patented Dec. 7, 1965

3,222,214
METHOD OF PREPARING ELECTRO-LUMINESCENT DEVICES
Costas C. Lagos and Lester W. Strock, Salem, Mass., assignors to Sylvania Electric Products Inc., a corporation of Delaware
Filed Sept. 5, 1961, Ser. No. 135,746
4 Claims. (Cl. 117—201)

This invention relates to electroluminescence, and more particularly to an improved method of preparing electroluminescent phosphors and fabricating the so-called ceramic electroluminescent devices concurrently.

Electroluminescent phosphors, such as suitably activated zinc sulfides, and ceramic electroluminescent devices, that is devices using a light transmitting ceramic material for the dielectric are well known in the art. Many procedures have been devised for the preparation of the phosphors and for the fabrication of the devices. With regard to the preparation of the phosphors, the more commonly accepted procedures may be categorized into two broad classifications according to the method of firing, that is, a one step firing procedure and a two step firing procedure. The crystal structure of the phosphor produced will depend upon which firing procedure is selected, together with other considerations, such as firing temperature and duration of firing.

Although we do not intend to limit our invention to any particular theory of crystal formation, the following explanation is presented to differentiate these two types of firing procedures. Since the most widely accepted electroluminescent phosphor is zinc sulfide, this explanation will be given with particular reference to this material.

Two crystal forms of zinc sulfide are commonly known, a cubic structure and a hexagonal structure and mixtures of these structures may also occur within the same crystal. When a crystal contains a single structure, or substantially a single crystal structure, the material may be known as an ordered crystal and when composites of the two structures occur within the same crystal, the material may be known as a disordered or imperfect crystal.

A cubic crystal is the structure generally obtained by firing a zinc sulfide mass at temperatures below about 1020° C. and the hexagonal crystal is the form obtained by firing a zinc sulfide mass at temperatures below the sintering point of a material, but above about 1020° C. Upon firing zinc sulfide having an ordered cubic crystal structure at temperatures above about 1020° C., the ordered cubic structure may be transformed into the ordered hexagonal structure and upon firing zinc sulfide having a hexagonal crystal structure at temperatures below 1020° C., the hexagonal crystals may be converted to the cubic structure. The extent of conversion from one crystal structure to the other will depend upon the firing temperature and the duration of firing, and a crystal form having controlled amounts of disorder or imperfections of the other crystal structure may be obtained by regulating these conditions.

While it is possible to prepare an ordered crystal of either structure, that is one having substantially only one crystal form, we believe that such materials which do not necessarily attribute their electroluminescence to the introduction of other crystal forms are practically valueless for electroluminescent illumination, since the material does not electroluminesce to any appreciable extent. But we believe that when a small amount of disorder of one crystal structure is introduced into the ordered crystal of another structure, electroluminescence may be exhibited by the phosphor upon excitation. Thus, electroluminescence is believed to depend upon the presence of disorder within the crystal structure and light is emitted from either zinc sulfide having a predominantly cubic structure containing hexagonal imperfections or from a predominantly hexagonal crystal structure containing cubic imperfections.

Now as we have stated, the two most widely accepted methods of preparing these various electroluminescent materials are either by a one step or two step firing process. The more recently developed two step firing process is often preferred over the one step method because of the greater degree of control available to the operators. In the one step method, a mass of non-electroluminescent zinc sulfide precipitate of small particle size is mixed with all materials necessary for the formation of the phosphor, such as the activator and the flux, and the mixture is then fired for a sufficient time to form an electroluminescent phosphor of a desired brightness. After firing, the material may be removed from the furnace, cooled and milled and then may be used. But no adequate, predeterminable control over firing duration is available and the brightness of the phosphor may vary widely depending upon the original crystal form distribution within the starting materials. Brightness control was empirical, at best.

And thus, it was determined that a two step firing method would be better for control purposes. In this development, the zinc sulfide material was heated for a sufficient time and at appropriate temperatures to form a substantially ordered crystal of either the hexagonal or the cubic form. In the preferred embodiment of the prior art, most of the materials necessary to form the phosphor, such as zinc sulfide for the matrix, copper salts for the activator and alkali chloride for the flux were intermixed and the resulting mixture was fired at temperatures above 1020° C., but below the sintering point of the zinc sulfide and preferably about 1200° C., to form an ordered hexagonal crystal. After the first firing, the essentially non-electroluminescent material obtained was cooled, fragmented, washed several times with water, intermixed with additional copper containing salts and refired at a lower temperature below the transition point of 1020° C., for example, 800 to 900° C., for a sufficient time to introduce a predetermined amount of imperfections of cubic structure into the predominantly hexagonal crystal. After the second firing the material had to be again cooled and fragmented, and then washed successively in two or three dilute acetic acid washes, four or five water washed and two or three dilute sodium cyanide washes, followed by two or three additional water washes. The material was dried and was then ready for use as a phosphor.

Now the procedural steps following the second firing were difficult and dangerous. Every last trace of acid from the acid wash had to be removed from the material before the sodium cyanide wash, since the acid would react with the sodium cyanide to form toxic hydrogen cyanide. Even after all the acid had been removed, additional washes were necessary because it was essential to remove all traces of sodium cyanide from the phosphor.

The drawing is a flow sheet setting forth in general terms the process of manufacturing concurrently an electroluminescent lamp and an electroluminescent phosphor.

According to our invention, which we call "lamp activation," we have discovered a method of preparing an electroluminescent phosphor in a two step process in which the troublesome washing steps subsequent to the second firing are eliminated. In addition, one of the firing steps previously necessary for the preparation of an electroluminescent phosphor prior to subsequent incorporation into a ceramic-type electroluminescent device is eliminated. We mix all materials necessary for the formation of an electroluminescent phosphor, that is the zinc sulfide, the activator, for example copper or a copper salt, and the flux, for example a suitable chloride such as barium or sodium chloride, and initially fire the materials at a predetermined temperature to form substantially ordered non-electroluminescent crystals. For example, when we desire ordered cubic crystals, the starting materials are fired at a temperature less than the transition point of 1020° C. and generally between 500 to 1000° C. and when we desire ordered hexagonal crystals, the starting materials are fired above the transition point of 1020° C., but below the sintering temperature and preferably between about 1150 to 1500° C. While the duration of firing of starting materials is important, it is important only to the extent that either an ordered cubic or hexagonal crystal should be formed. Varying batch sizes of starting materials will take various lengths of time to heat, however in general, there is no upper limit on the duration of firing of the starting materials so long as they are not allowed to oxidize materially and after ordered crystal formation the heating may be continued for as long as desired. After cooling, washing, and fragmenting the material produced by the above described firing operation is substantially non-electroluminescent. We then mix this substantially non-electroluminescent material with a glass dielectric of composition well known in the art generally melting about 500 to 850° C., such as disclosed in the U.S. Patent No. 2,774,737 to Mager. The dielectric generally called a glass frit, may be any of those conventionally used which are non-deleterious to the phosphor or the lamp and contains no components which might extinguish the lamp or materially retard brightness. These components may be for example, cobalt or possibly iron. The mixture can be coated on an electrically conductive base member, such as metal plate or glass which has been rendered electrically conductive, by methods well known in the art. After coating the base member with the mixture of the non-electroluminescent phosphor and glass frit, the entire unit is fired for a sufficient time and at appropriate temperatures to fuse the frit and to introduce a desired amount of disorder within the ordered cubic or hexagonal crystals. Coating the fused dielectric-phosphor layer with an electrically conductive, light transmitting film, such as stannous oxide, by methods well known in the art will produce a device which will electroluminesce upon excitation by a varying or alternating current. Thus, according to my invention, the second firing of the electroluminescent materials per se, is eliminated and the second firing or so called "activation firing" in which the non-electroluminescent, ordered crystal is transformed into a disordered crystal which will emit electroluminescent light, is carried on in situ together with the fabrication of the electroluminescent device. All of the washing steps usually performed after the second firing are eliminated and time consuming mixing and milling steps are minimized. Lamps produced by our process are at least equal to and often better than lamps produced when the phosphor is fired in a two step process apart from the lamp.

While it is known to activate a zinc sulfide material concurrently with the fabrication of a lamp, that is to perform a second step firing of the phosphor together with a lamp fabrication method, the process generally depended upon the use of an activator contained within the dielectric. In this second step firing, the activator within the frit assimulates into the crystal structure of the zinc sulfide to produce an activated phosphor. The method is rather inefficient however, because lamp brightness is materially reduced and apparently, insufficient activator is introduced. For example, the presence of electroluminescence was only noticed when the lamp was operated in an electric field of 100 volts per mil thickness of coatings and at a frequency of 9000 cycles per second. Since electroluminescent lamps are conventionally used in homes and operated at 60 cycles per second at line voltage, the lamps produced according to this process of the prior art are highly undesirable due to the need of incorporating expensive power conversion equipment in the electrical system to attain reasonable brightness.

Accordingly, the primary object of our invention is to simplify procedures for preparing electroluminescent phosphors and electroluminescent devices.

Another object of our invention is to eliminate tedious phosphor washing steps with materials such as acetic acid and the toxic sodium cyanide.

A further object of our invention is the fabrication of an electroluminescent lamp and the in situ electroluminescent activation of a zinc sulfide phosphor material, together with simplification of firing procedures.

A feature of our invention is the activation of an electroluminescent phosphor concurrently with the fabrication of an electroluminescent device.

And another feature of our invention is that within a two step firing process, all starting materials necessary for the preparation of an electroluminescent phosphor can be intermixed before any of the firing operations and no additional materials for the phosphor need be added before the second firing.

An advantage of our invention is that the steps for the preparation of an electroluminescent phosphor and subsequent preparation of the lamp is substantially simplified.

Another advantage of our invention is that brightness of an electroluminescent phosphor may be increased possibly because of the reduction in the number of firing steps.

The many other objects, features and advantages of the present invention will become manifest to those conversant with the art upon making reference to the detailed description which follows, in which a preferred method of concurrently preparing an electroluminescent phosphor and an electroluminescent device is described by way of illustrative examples.

The starting materials for preparing the electroluminescent phosphor, for example zinc sulfide and the flux and any of the usual activators such as copper, manganese, silver, arsenic, or bismuth, introduced as metal powders or the associated metal compounds for example, the carbonates, sulfates, or chlorides are intermixed together. Possible however, other activator materials in elemental or compound form such as lead, calcium, aluminium, lithium, gallium, indium, boron, lanthanum, cerium, praseodymium or neodymium may be used. Generally, the activator content of the phosphor starting materials will be greater than about 0.001%, but less than 5.0% and preferably less than 1.0% by weight. Now these percentages are percentages of activators intermixed into the initial starting materials and are not necessarily indicative of the amount of activator actually incorporated into the crystal lattice which may vary rather widely depending upon firing conditions and washing procedures.

It is conventional to add fluxes to the starting materials and alkali bromides or chlorides are found to be satisfactory flux materials. Particularly, potassium chloride or sodium chloride are inexpensive fluxes which may be used, although other halides, such as magnesium or barium chlorides may also have applicability. A selection of the particular flux will modify the temperature at which crystal formation occurs and these fluxes may be used singularly or in combination with each other. Usually there is no critical flux content to be used in a mixture and although we prefer to add the flux in quantities of about 3 to 12 percent by weight of the starting materials, greater or lesser amounts may be used. Generally however, the presence of such additional flux serves no useful purpose, since additional materials will only be removed in washing steps subsequent to the first firing.

After forming a homogeneous mixture of starting materials by blending for fifteen to thirty minutes or longer if desired, the mixture is transferred to a covered container, such as a quartz crucible or tray and fired at a temperature within one of the ranges of either 500 to 1000° C. or 1050 to 1300° C. for a sufficient time to form ordered crystals, generally longer than about 45 minutes, but preferably about 90 minutes. A long firing is not a requisite, but the duration must be sufficient to form ordered, but essentially non-electroluminescent crystals having the activator incorporated into the crystal lattice. While very long firings may be used, such procedures tend to be wasteful of heating energy since the crystals have been ordered and the activator incorporated therein. Thus, such long duration heating generally serves no real purpose. But if only very small quantities of starting materials are fired, the firing time will be rather short, possibly only fifteen to twenty minutes, and when more practical quantities are fired, such as 90 to 100 grams of material, the preferred firing time of 90 minutes should be used.

After the first firing, the crystals are removed from crucible and cooled. The essentially non-electroluminescent zinc sulfide cake is crushed, sieved through a fine screen and washed successively in hot and in cold water washes. Such washings remove residual fluxes from the treated material because such fluxes would tend to reduce the brightness of the ultimate phosphor. Promptly after washing, the material is dried by washing in acetone and heated at a temperature of about 100 to 200° C. for a few minutes. When dry, the zinc sulfide material is transferred to a ball mill and milled for about a half hour and then mixed with a finely divided, ceramic glass frit having a melting point lower than the sintering temperature of the phosphor, generally less than 1300° C., such as previously described in the reference to the patent to Mager. We have found that the frits according to the approximate compositions outlined in the following Table I are particularly desirable, however these compositions are merely illustrative of a frit which may be used.

TABLE I

|  | A, percent | B, percent | C, percent |
| --- | --- | --- | --- |
| $SiO_2$ | 20.7 | 22.7 | 25.8 |
| $B_2O_3$ | 26.6 | 23.3 | 26.6 |
| $Al_2O_3$ | 4.7 | 4.1 |  |
| $TiO_2$ | 2.0 | 2.3 |  |
| $Na_2O$ | 9.6 | 8.3 | 9.4 |
| $K_2O$ | .6 |  |  |
| $Li_2O$ | .5 | .4 |  |
| $CaO$ | 3.6 | 4.8 | 5.5 |
| $BaO$ | 4.2 | 3.5 | 4.0 |
| $ZnO$ | 26.8 | 25.2 | 28.7 |
| $F_2$ | 2.0 | 3.4 |  |
| $As_2O_3$ |  | 2.0 |  |

The ratios of frit to phosphor are those conventionally used in the art for the preparation of ceramic type, electroluminescent devices. Preferably, we prepare a mixture wherein the ratio of ceramic dielectric to phosphor is about 2 to 1 although the mixture may contain as little as 5 or 10% phosphor to as much as 90 to 95% phosphor, with the remainder made up by the ceramic dielectric. Slightly beyond either end of the range however, the lamp produced may be undesirable. For example, when slightly less than 5% phosphor is used, very little light will be emitted from the lamp. At the other end of the range, that is slightly greater than 95% phosphor, the phosphor will not adhere well to the base electrode and will be more susceptible to the adverse effects of humidity.

Now according to conventional methods, such as disclosed for example, in the United States patent to Dombrowski, No. 2,851,374, a liquid vehicle is added to the glass frit-zinc sulfide mixture and the resulting suspension is coated on an electrically conductive base plate which will subsequently serve as electrode in the fabricated device. The coating may be placed directly upon a metal plate or on glass which has been rendered electrically conductive, or when desired, we may first coat and fuse a glass frit dielectric layer on the base electrode and then subsequently, we may coat and fuse the above described phosphor-frit mixture on the fused dielectric layer. The use of the intermediate layer of frit greatly enhances the adhesion of the phosphor-frit layer.

Irrespective of the coating technique followed, the coated material is fired to fuse the glass and to activate the phosphor. If the first firing, that is the firing of the starting materials, was within a range which would form a hexagonal structure, that is a temperature of 1050 to 1300° C., then the second firing must be in the range of 500 to 1000° C., but if the first firing was in a range which would form a cubic structure, then the second firing must be in the range of 1050 to 1300° C. The firing time will vary depending upon the desired amount of disorder which is to be introduced into the ordered zinc sulfide crystal. Generally, the firing must be of sufficient duration to glaze the zinc sulfide material glass frit mixture. We have found that a firing of about 1 to 10 minutes may be used, but 5 minutes is preferred when a phosphor coated, conventional metal plate is being fired, but depending upon considerations such as the thickness of the base member or thickness of the coating, these firing times may be widely varied as desired.

Now almost immediately after we have fired the coated electroluminescent device, we spray the fused coating with a solution of stannous chlorides which will react to form the corresponding conductive oxide and form a light-transmitting electrode. When the base member and the light-transmitting electrode are connected to a source of alternating or varying current, light will be emitted from the phosphor dispersed in the fused glass dielectric.

Lamps prepared according to the above described method can be at least equal to and possibly materially brighter than those which were fabricated with phosphors prepared from a double firing procedure, such as taught by the prior art. In the following Table II a batch of material was formed from a first firing as described above. After this first firing and subsesuent cooling, washing and fragmenting, the batch was divided into portions and one portion was fired a second time in the conventional manner (2) and washed in acetic acid, water and cyanide and then incorporated into an electroluminescent device, while the other portion was lamp activated (1), in the procedure for the fabrication of the electroluminescent device. The second firing and washing and fragmenting steps were eliminated.

TABLE II

|  | Ft. Lamberts (Initial Brightness) | |
| --- | --- | --- |
|  | 120 v., 60 c.p.s. | 250 v., 250 c.p.s. |
| (1) Lamp Activation ZnS, 0.06% Cu | .69 | 5.31 |
| (2) Two Step Firing ZnS, 0.06% Cu | .68 | 4.66 |

Now as apparent from the above Table II, the initial brightness of the lamp activated phosphor (1) at 120 volts 60 cycles per second, which is ordinary house voltage is a bit brighter than the phosphor prepared by the prior art two step process (2). At higher voltages and frequencies the difference between the two procedures is radical.

The following examples for preparing a lamp activated phosphor are intended only as a further explanation of the invention and are not to be considered as limitative upon the claims.

*Example 1*

Mix 92 gms. phosphor grade ZnS, 3 gms. anhydrous $MgCl_2$ powder, 3 gms. $BaCl_2$ powder, 2 gms. NaCl powder and .15 gm. powdered $CuSO_4$. Roll the mixture in a bottle for 25 minutes in order to obtain a homogeneous material. Place the material in a covered quartz container and fire at 1200° C. for 90 minutes and then crush ZnS cake recovered from the furnace and sieve through 150 mesh screen. After sieving, wash with hot deionized water three times and cold deionized water twice. Dry by washing once with acetone and placing in 120° oven for about 5 minutes. Subsequent to drying, mill 50 gms. of material for 30 minutes in a pint ball mill half filled with glass balls. The ZnS at this stage is not an electroluminescent phosphor. Now mix the ZnS with a glass frit of the composition described in column A of Table I and coat a plate of glass which has been rendered electrically conductive with this mixture. During manufacture, the coated plate is fired at 750° C. for 10 minutes, thus making the ZnS electroluminescent. After the firing which glazes the frit, the coated plate is removed from the furnace and while hot, is coated with a solution of tin chlorides. The tin chlorides react to form the corresponding conductive oxides which constitute the light-transmitting electrode in the lamp. Light will be emitted from the phosphor when the electrodes are connected to a source of alternating current.

*Example II*

92 gms. of phosphor grade ZnS, 3 gms. anhydrous, $MgCl_2$ powder, 3 gms. $BaCl_2$ powder, 2 gms. NaCl powder and .15 gm. powdered $CuSO_4$ are mixed together and rolled in a bottle for 20 minutes to obtain a homogeneous material. This mixture is placed in a covered quartz container and fired at 800° C. for 7 hrs. After firing, the material is crushed and washed 3 times in hot water followed by 4 washings in cold water. Drying the material is performed by washing in acetone followed by heating in an oven to 120° C. for 5 minutes. After drying, 50 gms. of the material are milled for about one minute. At this stage, the material is not electroluminescent. To manufacture a lamp, the material is mixed with a glass dielectric and coated on an electrically conductive base plate. The coated plate is fired at 1200° C. for one minute. Spraying the fused glass frit while hot with a solution of stannous chloride will produce an electrically conductive coating on the phosphor-dielectric layer.

It is apparent that modifications may be made within the spirit and scope of the instant invention, but it is my intention however to be limited only by the scope of the appended claims.

As our invention we claim:

1. In the process for preparing an electroluminescent device, the steps which comprise: mixing together starting materials including an activator which are necessary for the formation of an electroluminescent phosphor; placing said starting materials in the furnace and firing to form substantially ordered, essentially non-electroluminescent crystals including said activator; removing said substantially ordered, non-electroluminescent crystals from said furnace and fragmenting to break up agglomerates; intermixing said essentially non-electroluminescent crystals with a finely divided, light transmitting ceramic dielectric having a melting point lower than the sintering temperature of said crystals; coating and said mixture on electrically conductive base; firing as the next firing in the process said coated base to activate the crystals and form a base coated with an adherent layer of electroluminescent phosphor dispersed within a fused, light transmitting ceramic dielectric.

2. In the process of fabricating an electroluminescent device, the steps which comprise: mixing together starting materials including an activator which are necessary to form a zinc sulfide electroluminescent phosphor; firing said starting materials in a furnace at a temperature within one of the ranges of 500 to 1000° C. and 1050 to 1300° C. to form ordered, essentially non-electroluminescent zinc sulfide crystals including said activator; removing said zinc sulfiide crystals from said furnace and fragmenting to break up agglomerates; intermixing said ordered zinc sulfide crystals with a finely divided, ceramic dielectric having a melting point lower than the sintering temperature of said zinc sulfide; coating said mixture on an electrically conductive base and firing as the next firing in the process said coated base at the other of the aforesaid temperature ranges of 500 to 1000° C. and 1050 to 1300° C. to form a base coated with an adherent layer of an activated zinc sulfide electrominescent phosphor dispersed within a fused, light transmitting, ceramic dielectric.

3. In the process for preparing an electroluminescent device, the steps which comprise: mixing together starting materials including an activator which are necessary to form a zinc sulfide electroluminescent phospher; firing said starting materials at a temperature of 500 to 1000° C. to form essentially non-electroluminescent zinc sulfide crystals having an ordered cubic structure; milling said cubic zinc sulfide crystals and admixing said milled crystals together with a light transmitting, ceramic dielectric having a melting point of lower than 1300° C.; coating the mixture on an electrically conductive base member and firing as the next firing in the process said coated base member in a furnace at a temperature of 1050 to 1300° C. to form a zinc sulfide electroluminescent phosphor of predominantly cubic crystal structure containing disorders of a hexagonal crystal structure, said zinc sulfide being dispersed within a fused, light transmitting ceramic dielectric.

4. In the process for preparing an electroluminescent device, the steps which comprise: mixing together materials necessary to form a zinc sulfide electroluminescent phosphor; firing said materials at a temperature of 1050 to 1300° C. to form a substantially non-electroluminescent zinc sulfide crystals with predominantly hexagonal crystal structure; mixing substantially non-electroluminescent zinc sulfide crystals with a finely divided, light transmitting, ceramic dielectric; coating said mixture on an electrically conductive base member and firing as the next firing in the process said coated base member in a furnace at a temperature of 500 to 1000° C. to form a base member coated with a zinc sulfide electroluminescent phosphor of predominantly cubic crystal structure containing disorders of hexagonal crystal structure, said zinc sulfide being dispersed within a fused light transmitting, ceramic dielectric.

References Cited by the Examiner

UNITED STATES PATENTS

| | | | |
|---|---|---|---|
| 2,824,992 | 2/1958 | Bouchard et al. | 252—301.4 X |
| 2,965,784 | 12/1960 | Hoffman | 252—301.65 |
| 2,982,876 | 5/1961 | Goldberg | 252—301.6 |
| 2,986,530 | 5/1961 | Hoffman | 252—301.65 |
| 2,987,485 | 6/1961 | Froelich | 252—301.65 |
| 3,000,834 | 9/1961 | Aven | 252—301.65 |
| 3,025,244 | 3/1962 | Aven | 252—301.6 |

RICHARD D. NEVIUS, *Primary Examiner.*